United States Patent [19]

Sirato

[11] Patent Number: 4,908,821
[45] Date of Patent: Mar. 13, 1990

[54] DATA COMMUNICATIONS SYSTEM HAVING A PACKET SWITCHING NETWORK

[75] Inventor: Toshimitsu Sirato, Yokohama, Japan
[73] Assignee: Hitachi, Ltd., Tokyo, Japan
[21] Appl. No.: 103,293
[22] Filed: Oct. 1, 1987
[30] Foreign Application Priority Data
   Oct. 1, 1986 [JP] Japan .................. 61-234180
[51] Int. Cl.⁴ ............................................. H04Q 11/04
[52] U.S. Cl. ........................................ 370/60; 370/94
[58] Field of Search .................. 370/60, 94, 110.5, 50
[56] References Cited

U.S. PATENT DOCUMENTS

| | | | |
|---|---|---|---|
| 4,443,875 | 4/1984 | Blausten | 370/94 |
| 4,477,899 | 10/1984 | Kato et al. | 370/94 |
| 4,569,042 | 2/1986 | Larson | 370/60 |
| 4,760,395 | 7/1988 | Katzeff et al. | 370/60 |

Primary Examiner—Joseph A. Orsino
Assistant Examiner—Frank M. Scutch, III
Attorney, Agent, or Firm—Antonelli, Terry & Wands

[57] ABSTRACT

A data communications system in which a PAD service host that gives service to non-packet terminals (NP-DTE) via a PAD (packet assembly and disassembly) is connected to a packet switching network that has PAD with packet assembling/disassembling function and protocol conversion function for the NP-DTE, and wherein a computer system that executes the TSS service is further connected to the packet switching network. The computer system is equipped with PAD emulation function that exists between the TSS and the packet switching network and that works in the same manner as the PAD for the TSS terminals and PAD service host, whereby the service of the PAD service host can be received through the TSS terminals.

6 Claims, 7 Drawing Sheets

DATA COMMUNICATIONS SYSTEM HAVING A PACKET SWITCHING NETWORK

BACKGROUND OF THE INVENTION

1. Field of the Invention

The present invention relates to a data communications system in which the data is communicated between the host computer and the terminal equipment via a packet switching network.

2. Description of the Prior Art

The packet switching system is a well-known communications system which will now be described briefly.

Data transferred through the packet switching network is divided into packets of a predetermined length, each having a header and a data block of a predetermined length necessary for being transferred in the network. The packet is stored in the packet switchboard and is then sent to the destination equipment.

Equipment connected to the packet switching network include the following two types. That is, one is an equipment which is called a packet mode device having a function (which is referred to as packet function here) which assembles the data that is to be transferred by itself into a packet and which disassembles the received packet and converts it into a series of data, and the other is an equipment called a non-packet equipment (NP-DTE) and which by itself does not have the above-mentioned packet function. Terminal equipment generally pertains to NP-DTE.

The packet switching network consists chiefly of a packet switch-board having a packet switching function, and a packet multiplexer (PMX) having a packet assembly and disassembly function (hereinafter referred to as PAD) which assembles or disassembles the packet for the NP-DTE and which executes the transfer control operation (protocol conversion which corresponds to a procedure which is contained in the packet mode but which is not contained in the non-packet terminal, or which corresponds to a procedure contrary thereto) like the packet mode equipment, the packet multiplexer further includes a traffic concentration function for multiplexing a plurality of packets on a transmission line.

When it is desired to receive the service of a host computer which is a packet mode equipment through a terminal which is NP-DTE such as a start-stop terminal, it is necessary to apply for subscription so that the general terminal is permitted to receive the service of the PAD and to register an identifier for the equipment. The data sent from the NP-DTE that receives the service from the PAD is compiled into a packet by the PAD and is sent to the host of the packet mode. Further, the packet sent from the host of the packet mode is disassembled and is transferred to the NP-DTE. The PAD further exchanges the PAD message necessary for the packet switching system relative to the packet mode host.

Thus, the service of the host of the packet mode is received from the NP-DTE through the packet switching network.

The communication procedure between the PAD and the packet mode equipment is executed according to a protocol which is called X.29 recommended by CCITT.

The above-mentioned packet switching system has been described in detail in such literatures as "A HANDBOOK OF DATA COMMUNICATIONS", compiled by the Japanese Association of Electronic Communications, published by Ohm Co., pp. 204–206, and "INTERFACE OF PACKET SWITCHING SERVICE", compiled by NTT Co., published by the Association of Nippon Data Communications, pp. 183–192 and 435–443.

Here, the packet mode host computer is called PAD service host which is connected to the PAD and which is receiving a packet from, or which is giving a packet to, the PAD according to the protocol X.29, i.e., which is carrying out the service relative to the PAD.

Here, it is presumed that a user of the NP-DTE connected to a given computer system is trying to receive a data base service by making access to a packet mode host computer that is connected to the packet switching network and that is carrying out the data base service.

In this case, the user is required to apply for a subscription so that the NP-DTE is permitted to receive the service of the PAD, and to connect it to the PAD.

Japanese Patent Laid-Open No. 131148/1982 teaches to connect to the packet switching network a packet mode host computer to which a plurality of NP-DTE's are connected. The communications are controlled between the packet mode equipment and the packet switching network according to the protocol X.25 recommended by CCITT. Therefore, the packet mode host computer is allowed to exchange the data relative to other packet mode equipment connected to the packet switching network according to the protocol X.25, but is not allowed to receive the service of the host computer which is carrying out the data base service according to protocol X.29 through the NP-DTE that is connected to the packet mode host computer. The service of the host computer is simply received through the NP-DTE which is connected thereto.

Therefore, even though there exists a computer system that includes a plurality of terminals that are connected to the host computer and that utilizes TSS (time sharing system), the users of the terminals who wish to receive the service of other host computers connected to the packet switching network must individually apply for the subscription and connection of terminal equipment to the PAD of the packet network.

SUMMARY OF THE INVENTION

The object of the present invention is to provide a data communications system with which the users of the terminal equipment receiving the TSS service from the host computer are permitted to receive the service from other computers connected to the packet switching network without requiring any procedure.

According to the present invention, the host computer which executes TSS is connected to the packet switching network to which the PAD service host is connected to transmit data to the PAD. The host computer is equipped with a PAD emulation function which exists between the TSS and the packet switching network to execute the processing that is equal to the protocol conversion function of PAD. Transmission of a data/request sent from the TSS terminal and transmission of reply for the data/request from the PAD service host, are converted and executed by the PAD emulation so as to meet the transfer procedure for the PAD and the PAD service host. Therefore, the service of the PAD service host can be received through the TSS terminal.

DESCRIPTION OF THE PREFERRED EMBODIMENTS

Figure 1:
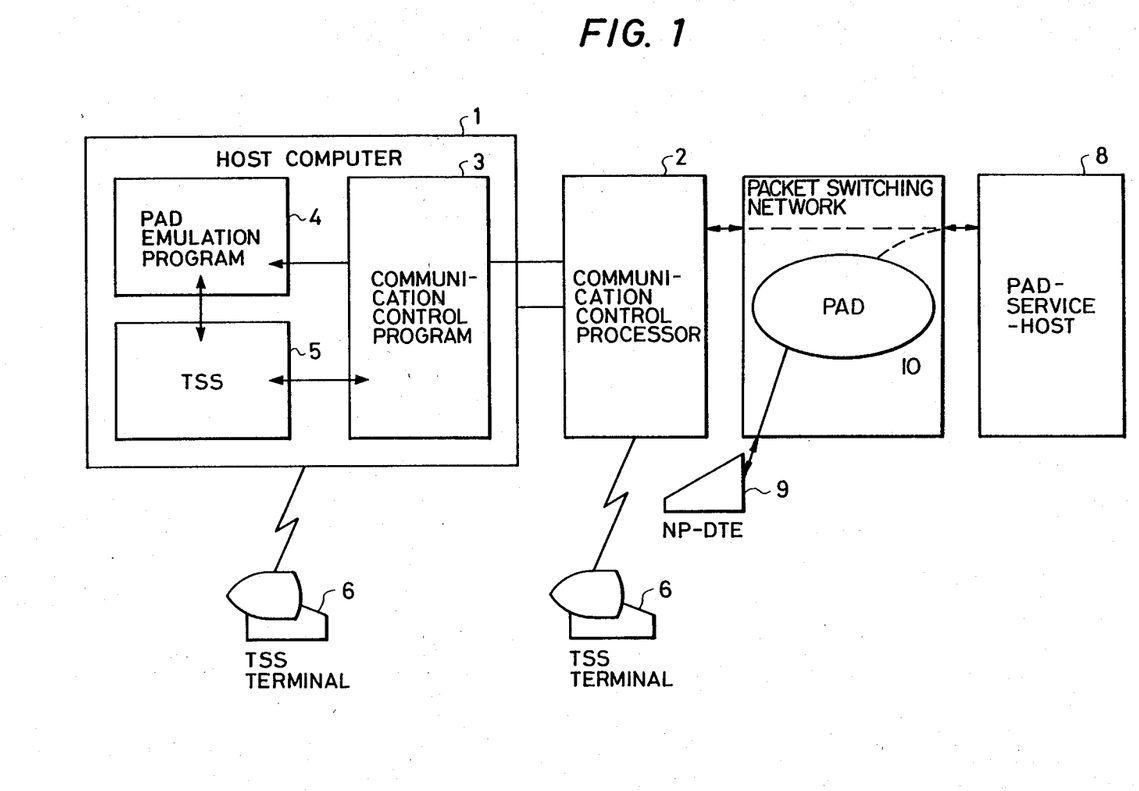
FIG. 1 is a diagram illustrating the whole structure according to an embodiment of the present invention.

FIG. 1 illustrates an embodiment of the present invention. A host computer 1 has a mechanism TSS 5 for executing the wellknown TSS, and a communication control program 3. To the host computer 1 is further connected a known communication control processor (hereinafter referred to as CCP) 2. A terminal (TSS terminal) 6 that receives the service of TSS is connected to the CCP 2 via a communication line. A process request from the TSS terminal 6 passes through the CCP 2 and is processed by the communication control program 3, and whereby a process request is given to the TSS 5 which executes the process in accordance with the process request and returns the result back to the TSS terminal 6 through the same root but in the opposite course. The TSS terminal 6 may often be connected to the host computer 1 without passing through the CCP 2. In the foregoing was described the general structure of the TSS.

A packet switching network 7 includes a PAD 10 which is connected a non-packet data transfer device (NP-DTE) 9. The packet switching network is also connected to a PAD service host, and data is transferred among these devices. To the packet switching network 7 is connected a TSS computer system having the host computer 1 and CCP 2.

The TSS computer system is a packet mode equipment, and a packet disassembling/assembling function is contained in the CCP 2. As described earlier, the PAD service host is so constructed as to operate according to the protocol X.29 to transfer the data relative to the PAD 10 in the packet switching network 7. In order that the service of the PAD service host 8 can be received through the TSS terminal 6 according to the present invention, the TSS computer system is so constructed as if it can be seen as the PAD 10 as viewed from the PAD service host 8. For this purpose, the host computer 1 is provided with a PAD emulation program (PADEM) 4. As a command which requests communication relative to the PAD service host 8 is sent from the TSS terminal 6 to the TSS 5, the TSS 5 requests the PADEM 4 to control the communication relative to the PAD service host 8. The PADEM 4 so controls that the data can be transmitted relative to the PAD service host 8 maintaining the protocol X.29, so that the host computer looks like the PAD 10, and sends the data to the CCP 2 which assembles the data that is sent into the form of a packet and sends it to the packet switching network 7. The CCP 2 which has received the packet sent from the PAD service host 8 disassembles it and sends it to the PADEM 4. Then, the PADEM 4 executes the processing to send the reply to the PAD service host 8 like the PAD 10 or to transfer the received data to the TSS 5.

According to the present invention, the communication can be effected from the TSS terminal to the PAD service host without requiring any particular procedure for terminal subscription.

Figure 2A:
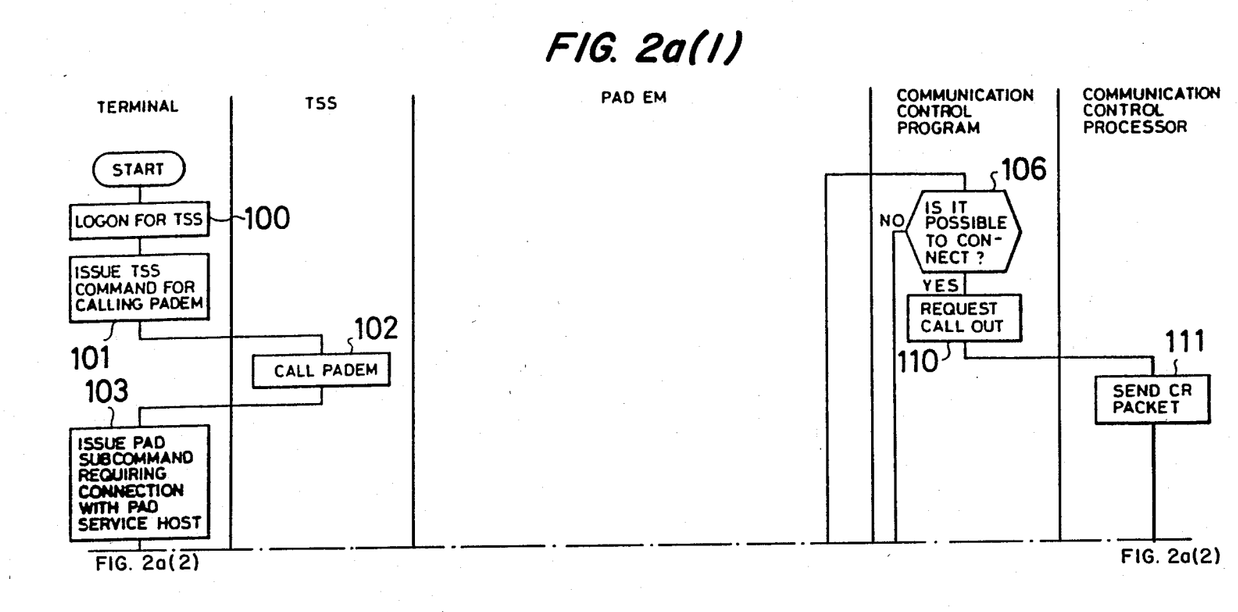
FIGS. 2a and 2b are flow charts illustrating in detail the processing mechanisms according to the embodiment of FIG. 1.
Figure 2B:
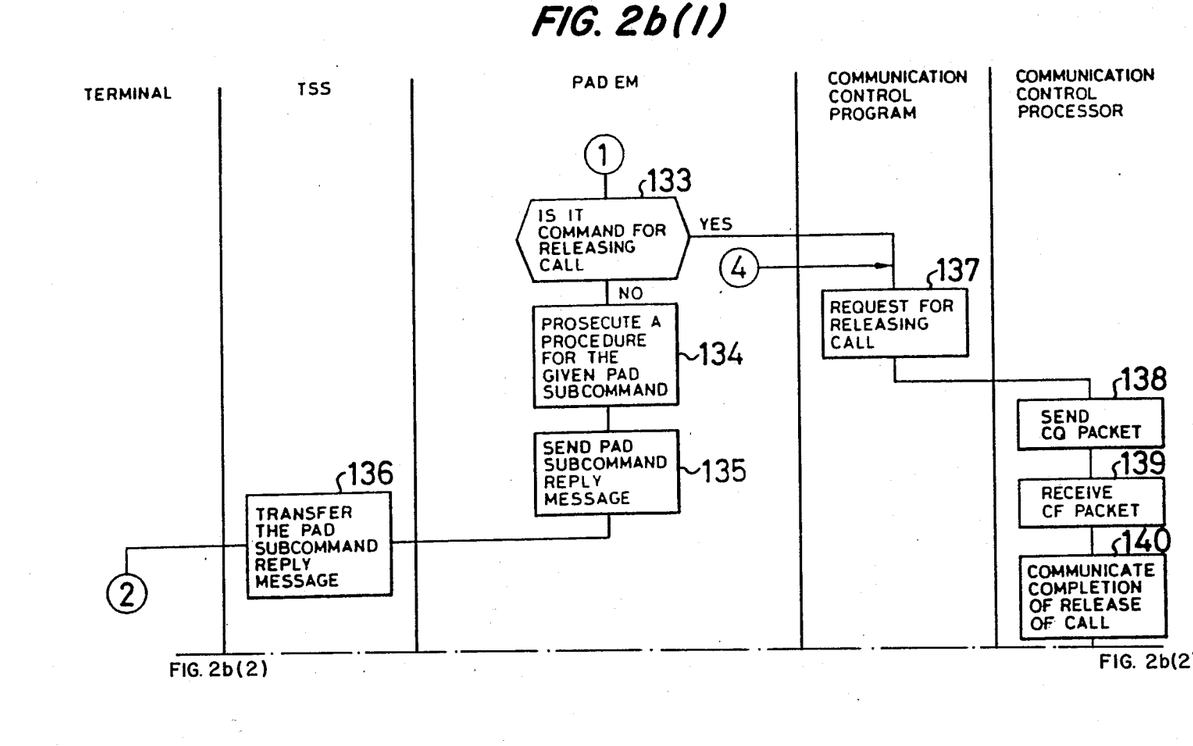

The structure of the embodiment of FIG. 1 will now be described in detail in conjunction with FIGS. 2a and 2b. Only those portions of the programs related to the present invention are illustrated, and the portions same as those of the conventional art are not described except PADEM.

A general command LOGON is issued (100) from the TSS terminal to TSS to start the use of TSS and, then, a TSS command for calling PADEM according to the invention is issued (101) in response to the operation by the operator. In response thereto, TSS calls PADEM (102). A terminal receives a PAD subcommand (103) requesting connection to the PAD service host. The PAD subcommand is equivalent to a PAD command that is input to the PAD from a non-packet terminal. The TSS which has received the PAD subcommand transfers it to the PADEM which requests the communication control program to make connection to the service host (105).

The communication control program checks whether the circuit is busy or not (106), and informs the PADEM of the failure of connection when the circuit is busy and the connection is not possible. Being informed of this, the PAD prepares a PAD subcommand reply message which indicates the failure of connection and sends it to the TSS (108) which transfers the received PAD subcommand reply message to the terminal (109) to finish the processing. When the connection is possible at the step 106, the call out is requested to the CCP (110).

The CCP complies the request of call out into CR (call out request) and sends it to the packet switching network (111). In response to the call out packet sent from the PAD service host within a predetermined period of time, the CCP checks whether the CC (connection completion) packet is sent after it is issued from the packet switching network. The CCP effects the above processing (113) when the CC packet is not sent, and informs the completion of establishing the call (114) when it has received the CC packet. Upon receipt of this, the communication control program informs the PADEM of the success of connection (115). The PADEM prepares a PAD subcommand reply message that indicates the success of connection and sends it to the TSS (116). The TSS transfers the received PAD subcommand reply message to the terminal (117) which is then enabled to sending or receiving the data (118).

When the data is sent from the terminal (119), the TSS transfers the data to the PADEM (120). The PADEM determines whether the data that is received is a PAD parameter that indicates "PAD recall". The PAD parameter is information which controls the data transfer using PAD. When it is not the PAD parameter, the PADEM determines whether it is a break signal (122). When it is not the break signal, the PADEM sends the data to the communication control program (124). The data is transferred to the CCP (125) which compiles it into DT (data) packet and sends it to the packet switching network (126). When the data is a parameter for PAD recalling in the step 121, there is established the condition for waiting for PAD subcommand (127). Next, as the data is sent from the terminal (128), the TSS transfers the data to the PADEM (129) in a manner as described above whereby the PADEM determines whether the data is a PAD subcommand (130). When the data is the PAD subcommand, the program proceeds to the head of FIG. 2b. The PAD subcommand is the one which requests change/read of PAD parameter, and which requests set of call/release of call/condition conformation. When the data is not so, it is then determined to be error, and whereby the PADEM prepares a PAD subcommand reply message and sends it to the TSS (131). The TSS sends the PAD subcommand reply message to the terminal (132) which then returns to the condition to wait for the input of next data. The operation will be further described in conjunction with FIG. 2b.

When the PAD subcommand is sent, the PADEM determines if it is a command for releasing call (133). When it is not so, the PADEM performs the processing (134) that corresponds to the PAD subcommand that is sent, and sends the PAD subcommand reply message to the TSS (135). Here, for instance, when a read subcommand is received, the PAD parameter prepared in the PADEM is sent as a PAD subcommand reply message. The TSS transfers the PAD subcommand reply message to the terminal (136) which then assumes the condition to wait for the input of the next data. When it is determined in the step 133 that the data is a command for releasing call, the data is then sent to the communciation control program which sends a request for releasing call to the CCP (137). The CCP compiles it into a CQ (restoration request) packet and sends the CQ packet to the packet switching network (138). When a corresponding CF (restoration confirmation) packet is received (139) from the packet switching network, the CCP informs of the completion of call release (140). The communication control program receives the completion of call release and sends it to the PADEM (141) which prepares a PAD subcommand reply message that indicates the release of call, and sends it to the TSS (142). Then, the TSS transfers the PAD subcommand reply message to the terminal (143), and the communication between the TSS terminal and the PAD service host is finished.

The DT packet is received from the packet switching network by the CCP (144) and is disassembled, and the data is transferred to the PADEM via the communication control program (145). The data is determined (146) whether it is a PAD message or not. When the data is not the PAD message, it is modified based upon the PAD parameter and is sent to the TSS (148) which then sends the data to the terminal (149). When the data is a PAD message, it is determined whether the PAD message is a release solicit message (150). When the PAD message is the release solicit message, the request is issued to release the call (151). When the PAD message is not the release solicit message, the receiving process (151) is carried out for the PAD message that is received, and an indication message is prepared and is sent (153) to inform of the PAD parameter value. The indication message passes through the communication control program (154), compiled by the CCP into the DT packet and is sent to the packet switching network (155).

In the foregoing was described the mechanism for establishing the call of data communication from the TSS terminal to the PAD service host through up to the processing for releasing the call. The processing of PADEM toward the packet switching network satisfies the communication procedure between the PAD and the PAD service equipment in compliance with the protocol X.29. The processing toward the terminal side is the same as the case where the PAD give service to the NP-DTE.

When the TSS command for calling PADEM is not produced but the TSS command is produced requesting the processing by the TSS in a conventional manner after the command of LOGON has been issued from the terminal to the TSS, then the TSS executes the processing requested by the function that pertains to the prior art, sends the result to the terminal, and whereby the processing of the conventional TSS is executed. FIGS. 2a and 2b illustrate the operation in a manner as if the data are directly transmitted and received between the terminals and the TSS. When the TSS terminal is connected to the CCP, however, there exist the CCP and the communication control program between the terminal and the TSS. In this case, the functions and structures of the CCP and communication control program are quite the same as those of the conventional art.

According to the present invention, services of other host computers connected to the packet switching network can be received through a terminal that is receiving the TSS service.

I claim:

1. A data communications system having a packet switching network which includes a first packet assembly and disassembly (PAD) means for connecting non-packet terminal units to the packet switching network, comprising:

a PAD service host connected to said packet switching network and having a packet function which gives service to the non-packet terminal units via said first PAD means and communicates with said first PAD means in a particular protocol defined by communications from said non-packet terminal units through said first PAD means; and a computer system connected to said packet switching network and having a second packet assembly and disassembly (PAD) means for assembling and disassembling packets exchanged between said packet switching network and said computer system, a time sharing system and a plurality of terminal units connected to said time sharing system, said computer system further including a protocol conversion means, being connected between said PAD service host and said time sharing system, for executing a protocol conversion so as to respond to said PAD service host the same as said first PAD means responds.

2. A data communications system having a switching network which includes a first packet assembly and disassembly (PAD) means for connecting non-packet terminal units to the packet switching network, comprising:

a PAD service host connected to said packet switching network and having a packet function which gives service to the non-packet terminal units via said first PAS means, data being transferred between said PAD service host and said first PAD means in accordance with a particular communication procedure; and a computer system connected to said packet switching network and having a second packet assembly and disassembly (PAD) means for assembling and disassembling packets exchanged between said packet switching network and said computer system, a time sharing system and a plurality of terminal units connected to said time sharing system, said computer system further including control means, being provided between said time sharing system and said packet switching network, for controlling the transfer of data in accordance with said particular communication procedure.

3. A data communications system having a packet switching network which includes a packet assembly and disassembly (PAD) that connects non-packet terminal units to the packet switching network, comprising:

a PAD service host connected to said packet switching network and having a packet function which gives service to the non-packet terminal units via said PAD; and a computer system connected to said packet switching network;

wherein said computer system includes a plurality of non-packet TSS terminal units, a time sharing system which gives service to said TSS terminal units, a communication control processor which is connected to said packet switching network, assembles data sent to the packet switching network into a packet, and disassembles a packet sent from the packet switching network, a communication control program, and a conversion means which is provided between said time sharing system and said communication control program, and which executes the conversion of protocol between said TSS terminals and said PAD service host, wherein said communication control program executes the transmission and reception of data between said conversion means and said communication control processor.

4. A data communications system having a packet switching network which includes a first packet assembly and disassembly (PAD) means for connecting non-packet terminal units to the packet switching network, comprising:

a PAD service host connected to said packet switching network and having a packet function which gives service to the non-packet terminal units via said first PAD means and communicates with said first PAD means in a predetermined protocol defined by communications from said non-packet terminals through said first PAD means; and a computer system connected to said packet switching network and having a second packet assembly and disassembly (PAD) means for assembling and disassembling packets exchanged between said packet switching network and said computer system, means for serving a plurality of terminal units and a plurality of terminal units connected to said means for serving a plurality of terminal units, said computer system further including a protocol conversion means, being connected between said PAD service host and said means for serving a plurality of terminal units, for performing a protocol conversion in compliance with predetermined protocols between said PAD service host and said means for serving so as to respond to said PAD service host the same as said first PAD means responds.

5. A data communications system set forth in claim 1, in which said computer system further comprises a communication control processor, and said second PAD means being provided in said communication control processor.

6. A data communication system set forth in claim 1, in which said protocol conversion means executes the protocol conversion in response to a command issued at said terminal units.

* * * * *